US007833466B2

United States Patent
Hirota et al.

(10) Patent No.: US 7,833,466 B2
(45) Date of Patent: Nov. 16, 2010

(54) BIAXIALLY ORIENTED POLYESTER CONTAINER AND METHOD OF MANUFACTURING THE CONTAINER

(75) Inventors: Norihisa Hirota, Kanagawa (JP); Satoshi Shibata, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 691 days.

(21) Appl. No.: 10/500,192

(22) PCT Filed: Aug. 19, 2003

(86) PCT No.: PCT/JP03/10432

§ 371 (c)(1),
(2), (4) Date: Feb. 25, 2005

(87) PCT Pub. No.: WO2004/018307

PCT Pub. Date: Mar. 4, 2004

(65) Prior Publication Data

US 2005/0140036 A1 Jun. 30, 2005

(30) Foreign Application Priority Data

Aug. 20, 2002 (JP) ............... 2002-239790

(51) Int. Cl.
B29C 49/08 (2006.01)
B29C 49/12 (2006.01)
B29C 49/18 (2006.01)

(52) U.S. Cl. .............. 264/521; 264/530; 264/532; 264/535

(58) Field of Classification Search ............... 428/35.7, 428/1.6; 264/521, 532, 530, 535; 215/373, 215/381

See application file for complete search history.

(56) References Cited

U.S. PATENT DOCUMENTS 4,177,239 A * 12/1979 Gittner et al. ............... 264/530

(Continued)

FOREIGN PATENT DOCUMENTS

EP 1 208 957 A1 5/2002

(Continued)

OTHER PUBLICATIONS

Supplementary European Search Report, dated Jul. 28, 2010, issued in corresponding European Application No. 03792705.0, filed Aug. 19, 2003 (3 pages).

Primary Examiner—Rena L Dye
Assistant Examiner—Erik Kashnikow
(74) Attorney, Agent, or Firm—Christensen O'Connor Johnson Kindness PLLC

(57) ABSTRACT

A biaxially oriented polyester container with a uniformly and sufficiently elongated and thin-walled bottom part having excellent drop strength, improved ESC resistance and reduced weight, and a method of manufacturing the container. The biaxially oriented polyester container of the present invention is characterized in that, when an X-ray diffraction measurement is performed in and near a bottom center area of the biaxially oriented polyester container formed by a double-stage orientation blow molding method, a peak indicative of molecular orientation is observed near a diffraction angle of $2\theta=15$ to $30°$ and an orientation parameter (BO) expressed by the following formula (1) is in the range of $0.5 \leq BO \leq 2$ in and near the bottom center area:

orientation parameter $(BO) = Ix/Iy$        (1)

(where Ix indicates a diffraction intensity near the diffraction angle of $2\theta=15$ to $30°$ when the X-ray diffraction measurement is performed in the X-direction, and Iy indicates a diffraction intensity near the diffraction angle of $2\theta=15$ to $30°$ when the X-ray diffraction measurement is performed in a direction orthogonal to that for Ix).

1 Claim, 8 Drawing Sheets

U.S. PATENT DOCUMENTS

| | | | |
|---|---|---|---|
| 4,476,170 A * | 10/1984 | Jabarin | 428/36.92 |
| 4,641,758 A * | 2/1987 | Sugiura | 215/42 |
| 5,520,877 A * | 5/1996 | Collette et al. | 264/521 |
| 5,562,960 A * | 10/1996 | Sugiura et al. | 428/35.7 |
| 6,349,838 B1 | 2/2002 | Saita et al. | |
| 6,627,279 B2 * | 9/2003 | Hirota et al. | 428/35.7 |
| 2002/0074336 A1* | 6/2002 | Silvers | 220/623 |
| 2002/0150703 A1* | 10/2002 | Collette et al. | 428/34.1 |
| 2004/0022976 A1* | 2/2004 | Kato et al. | 428/35.7 |

FOREIGN PATENT DOCUMENTS

| | | |
|---|---|---|
| EP | 0 683 029 B1 | 7/2002 |
| JP | 63-78728 A | 4/1988 |
| JP | 05-200839 A | 8/1993 |
| JP | 07-156933 A | 6/1995 |
| JP | 09-216275 A | 8/1997 |
| JP | 11-348956 A | 12/1999 |
| JP | 2002-67131 A | 3/2002 |
| WO | WO 02/44038 A1 * | 11/2001 |

* cited by examiner

BIAXIALLY ORIENTED POLYESTER CONTAINER AND METHOD OF MANUFACTURING THE CONTAINER

TECHNICAL FIELD

The present invention relates to a biaxially oriented polyester container with a uniformly and sufficiently elongated and thin-walled bottom part having excellent properties such as drop strength, and to a method of manufacturing the container.

BACKGROUND ART

Biaxially oriented polyester containers produced by shaping preforms made of polyester resins, such as polyethylene terephthalate (PET), into the form of a wide-mouthed bottle or a usual bottle with biaxial orientation blow molding are superior in transparency, impact resistance and gas barrier property, and are widely employed in various fields including foods, seasonings and beverages in applications requiring resistance against heat, heat and pressure, and pressure.

In applications requiring resistance against heat, for example, such a biaxially oriented polyester container is produced through the steps of heating a preform, of which mouth part has been subjected to a crystallizing process, to temperatures not lower than the glass transition point (Tg), performing biaxial orientation blow molding of the heated preform using a biaxial orientation blowing mold, and heat-setting a barrel part of the container at temperatures (100-150° C.) not lower than the crystallization temperature so as to remove residual stresses generated during the biaxial orientation blowing and to provide heat resistance.

Figure 11:
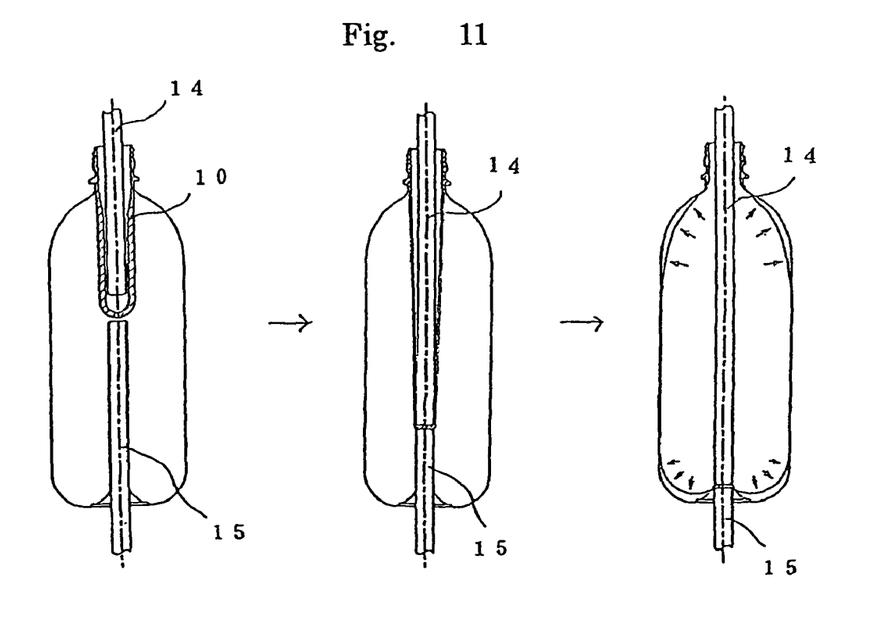
FIG. 11 is a set of views for explaining known single-stage biaxial orientation blow molding.

With such single-stage biaxial orientation blow molding, however, because a polyester container is formed by performing the biaxial orientation blow molding in a state in which a bottom part of a preform 10 is restrained by a stretch rod 14 and a press rod 15 as shown in FIG. 11, the bottom part of the polyester container is not sufficiently elongated and a non-elongated portion remains in or near a bottom center area of the polyester container.

Accordingly, if the bottom part is heat-set at high temperatures to be adapted for applications requiring resistance against either heat or heat and pressure, the bottom part is whitened due to thermal crystallization and a commodity value of the final product deteriorates. For that reason, the bottom part has been heat-set in the range of about 75-100° C., and an application range of the thus-produced polyester container has been limited correspondingly. Further, the non-elongated portion has a thick wall and hence impedes a reduction of weight of the polyester container.

Figure 12:
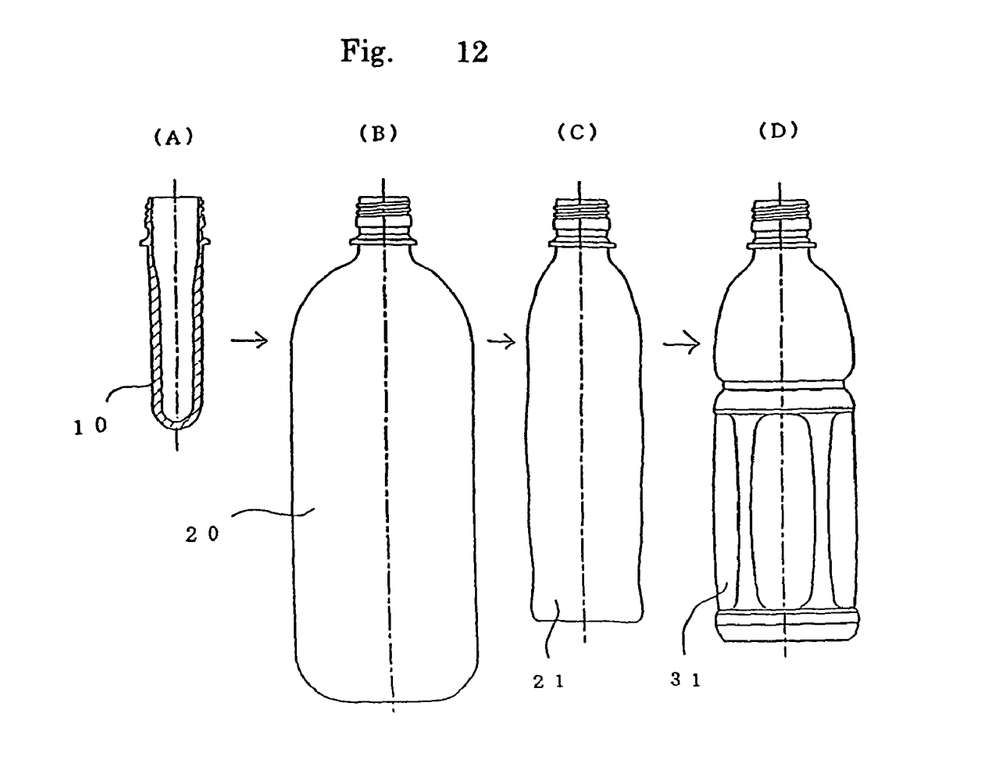
FIG. 12 is a set of views for explaining double-stage orientation blow molding.

On the other hand, another known biaxial orientation blow molding method comprises the steps of, as shown in FIG. 12, heating a preform 10, of which mouth part has been subjected to a crystallizing process, to temperatures not lower than the glass transition point (Tg), performing primary orientation blow molding of the heated preform with a primary mold to obtain a primary molded product 20 larger than a final molded product, heat-shrinking the primary molded product 20 into a secondary molded product 21, and performing secondary orientation blow molding of the secondary molded product 21 with a secondary mold, thereby obtaining a polyester container 31. (See, e.g., Japanese Patent Laid-Open No. 9-216275).

The above known method enables the bottom part of the polyester container to be elongated at a higher rate and to have a thinner wall. As in the single-stage biaxial orientation blow molding, however, the biaxial orientation blow molding to obtain the primary molded product with the primary mold is performed in a state in which a bottom part of the preform 10 is restrained by a stretch rod 14 and a press rod 15 as shown in FIG. 11. Therefore, the primary molded product is not sufficiently elongated in or near a bottom center area thereof. For that reason, even when the polyester container is formed by the double-stage orientation blow molding, a non-elongated portion remains in or near the bottom center area of the container. Hence, similar problems to those mentioned above are left unsolved.

Further, when the polyester container is formed by performing the biaxial orientation blow molding in the state in which the bottom part of the preform 10 is restrained by the stretch rod 14 and the press rod 15, a surrounding area of the restrained portion is highly uniaxially oriented and a plastic container made of polyester and the like tends to crack in the direction of the uniaxial orientation, thus causing problems in points of drop strength and ESC (Environmental Stress Cracking) resistance. An attempt of overcoming those problems with an improvement of the mold shape requires a bottom part of the mold to be formed into a complicated shape, takes a longer time for mold design, and hence increases the production cost.

Accordingly, it is an object of the present invention to solve the above-mentioned problems in the art, and to provide a biaxially oriented polyester container with a uniformly and sufficiently elongated and thin-walled bottom part having excellent drop strength, improved ESC resistance, and reduced weight, and to provide a method of manufacturing the container.

DISCLOSURE OF THE INVENTION

The present invention provides a biaxially oriented polyester container formed by a double-stage orientation blow molding method, wherein when an X-ray diffraction measurement is performed in and near a bottom center area of the biaxially oriented polyester container, a peak indicative of molecular orientation is observed near a diffraction angle of $2\theta = 15$ to $30°$ and an orientation parameter (BO) expressed by the following formula (1) is in the range of $0.5 \leq BO \leq 2$ in and near the bottom center area:

$$\text{orientation parameter } (BO) = Ix/Iy \quad (1)$$

(where Ix indicates a diffraction intensity near the diffraction angle of $2\theta = 15$ to $30°$ when the X-ray diffraction measurement is performed in the X-direction, and Iy indicates a diffraction intensity near the diffraction angle of $2\theta = 15$ to $30°$ when the X-ray diffraction measurement is performed in a direction orthogonal to that for Ix)

Also, the present invention provides a method of manufacturing a biaxially oriented polyester container, the method comprising the steps of performing primary orientation blow molding of a preform made of a polyester resin to obtain a primary molded product larger than a final molded product, heat-shrinking the primary molded product into a secondary molded product, and performing secondary orientation blow molding of the secondary molded product to obtain the final molded product, wherein in the step of blow-molding a bottom part of the primary molded product, the primary orientation blow molding is performed with the bottom part of the preform released from a restrained state, thereby forming the biaxially oriented polyester container having the orientation parameter in the above-mentioned particular range.

BEST MODE FOR CARRYING OUT THE INVENTION

[Biaxially Oriented Polyester Container]

A biaxially oriented polyester container of the present invention is featured in that, when an X-ray diffraction measurement is performed in and near a bottom center area of the biaxially oriented polyester container, a peak indicative of molecular orientation is observed near a diffraction angle of $2\theta=15$ to $30°$ and an orientation parameter (BO) expressed by the following formula (1) is in the range of $0.5 \leq BO \leq 2$ in and near the bottom center area:

$$\text{orientation parameter } (BO) = Ix/Iy \tag{1}$$

(where Ix indicates a diffraction intensity near the diffraction angle of $2\theta=15$ to $30°$ when the X-ray diffraction measurement is performed in the X-direction, and Iy indicates a diffraction intensity near the diffraction angle of $2\theta=15$ to $30°$ when the X-ray diffraction measurement is performed in a direction orthogonal to that for Ix)

Figure 1:
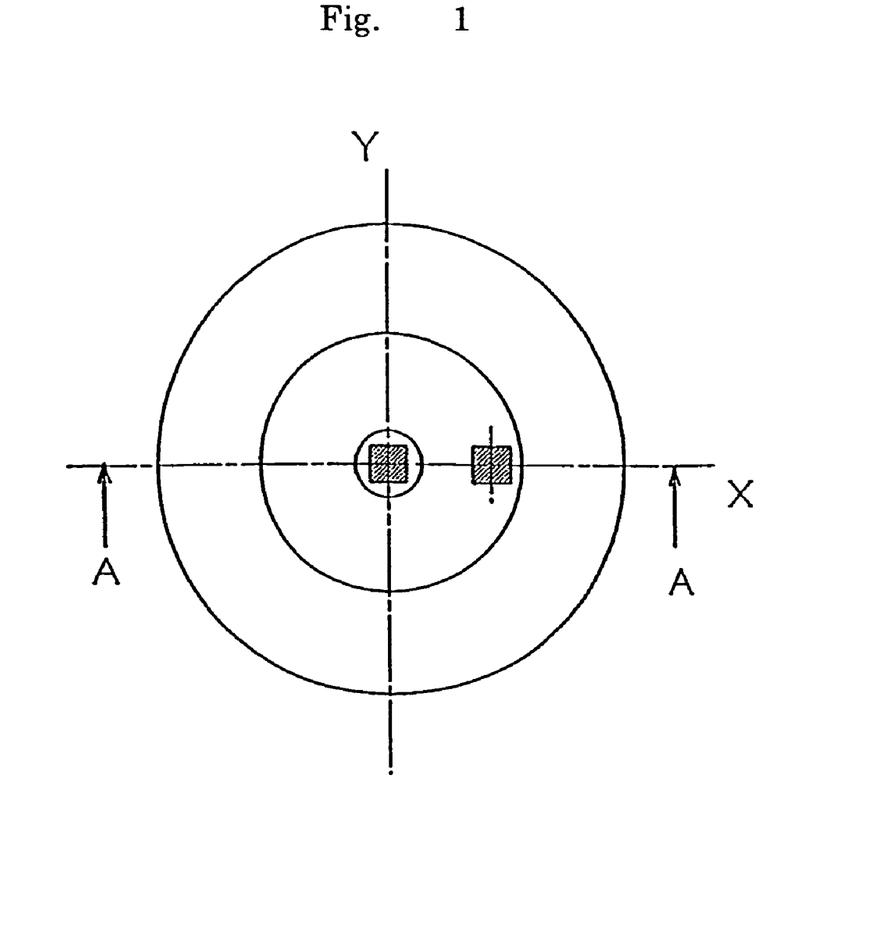
FIG. 1 is a schematic view for explaining positions where samples for use in an X-ray diffraction measurement are cut out.
Figure 2:
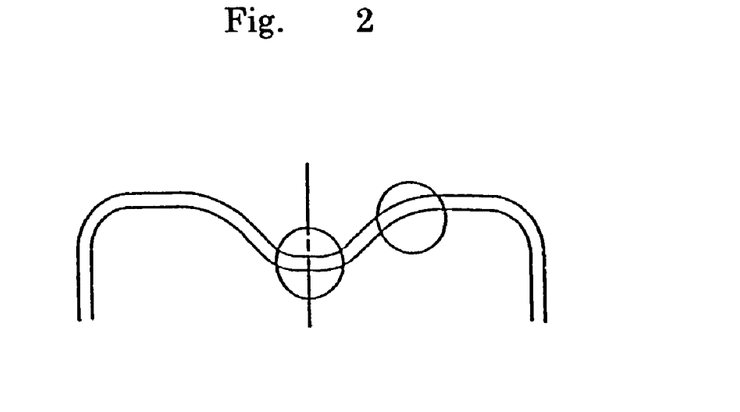
FIG. 2 is a sectional view taken along a line A-A in FIG. 1.

To explain in more detail, FIG. 1 is a bottom view of the biaxially oriented polyester container of the present invention, namely a schematic view showing positions where samples for use in the X-ray diffraction measurement are cut out from a bottom part of the container, and FIG. 2 is a sectional view taken along a line A-A in FIG. 1.

In the present invention, for measuring the orientation parameter (BO) in the bottom center area of the biaxially oriented polyester container, as shown in FIG. 1, a sample is cut out as a piece (e.g., a square sample piece having each side of about 5 mm) covering an area around a bottom center (i.e., a crossed point of an X-axis and a Y-axis in FIG. 1) of the biaxially oriented polyester container. The diffraction angle $2\theta$ is then measured by using an X-ray diffraction measuring device to confirm the orientation state of the sample piece in the X-direction.

Subsequently, the same sample piece is rotated 90° and the diffraction angle $2\theta$ is measured in a similar manner to confirm the orientation state of the sample piece in the Y-direction.

Further, in the present invention, for measuring the orientation parameter (BO) near the bottom center area of the biaxially oriented polyester container, a sample piece (e.g., a square sample piece having each side of about 5 mm) is cut out from the bottom part of the container except for the above-mentioned bottom center area with a sample piece center set to an arbitrary position away from the bottom center by a distance smaller than ½ of the radius of the container bottom part in the X-direction in FIG. 1. The diffraction angle $2\theta$ is then measured in a similar manner to that in the measurement for the bottom center area.

When the container is a multilayered container made up of a polyester resin layer and one or more other layers, a sample for the X-ray diffraction measurement is prepared by peeling off the polyester resin layer from the sample piece cut out from the bottom part of the container.

Here, the term "diffraction angle $2\theta$" means an angle of a reflected ray relative to an incident ray on condition that an X-ray is incident upon the sample piece and causes a diffraction phenomenon due to crystal surfaces in a material.

It is generally known that, when a polyester resin such as a polyethylene terephthalate is subjected to orientation molding, molecule chains exhibit a regularly arrayed structure due to oriented crystallization, and molecule crystal surfaces have a certain directivity and show a peak near each diffraction angle $2\theta=16°$, $22°$ and $26°$, i.e., the range of about 15° to 30°. However, the intensity of such a peak indicates a degree of orientation in the direction of measurement, but does not indicate the directivity of orientation and an orientation ratio.

The inventors have found that, in view of the directivity of orientation and the orientation ratio serving as important factors for realizing a uniformly elongated and thin-walled bottom part having excellent drop strength and improved ESC resistance, the orientation parameter (BO) expressed by the following formula (1) gives an index representing the directivity of orientation and the orientation ratio;

$$\text{orientation parameter } (BO) = Ix/Iy \tag{1}$$

on condition that Ix, Iy indicate intensities of respective orientation peaks near the diffraction angle of $2\theta=15$ to $30°$ when the X-ray diffraction measurement is performed respectively in the X-direction and in the Y-direction orthogonal to the X-direction.

The orientation parameter (BO) is a dimensionless number representing the directivity of orientation. BO=1 means uniform biaxial orientation in both the X- and Y-directions. BO<1 means a larger degree of orientation in the X-direction, and BO>1 means a larger degree of orientation in the Y-direction.

In the biaxially oriented polyester container of the present invention, the bottom part of the container is formed such that the orientation parameter (BO) in and near the bottom center area is in the range of $0.5 \leq BO \leq 2$, i.e., that the bottom part is uniformly biaxially elongated in both the X- and Y-directions substantially to the same extent. As a result, a uniformly elongated and thin-walled bottom part having excellent drop strength, and improved ESC resistance is obtained.

If the orientation parameter (BO) is smaller than 0.5, the molecule orientation in the circumferential direction would be increased. On the other hand, if the orientation parameter (BO) is larger than 2, the molecule orientation in the radial direction would be increased. Such a larger degree of uniaxial orientation results in that the container tends to crack in the direction exhibiting the larger degree of uniaxial orientation, and hence the drop strength and the ESC resistance deteriorate.

With the known molding method, because the biaxial orientation blow molding is performed in the state in which the bottom part of the preform 10 is restrained by the stretch rod and the press rod as described above, the biaxially oriented polyester container cannot be obtained in which the orientation parameter (BO) in and near the bottom center area is in the range specified according to the present invention.

In the biaxially oriented polyester container of the present invention, since the bottom part is uniformly biaxially elongated substantially to the same extent, the bottom part can be heat-set at high temperatures so as to provide heat resistance, at which the heat setting has been difficult to perform in the prior arts because of the problem of whitening caused by thermal crystallization. Therefore, the container of the present invention is particularly effective for use in heat-resistant applications at high temperatures.

[Method of Manufacturing Biaxially Oriented Polyester Container]

A preferred method of manufacturing the biaxially oriented polyester container of the present invention will be described below with reference to the drawings.

Figure 3:
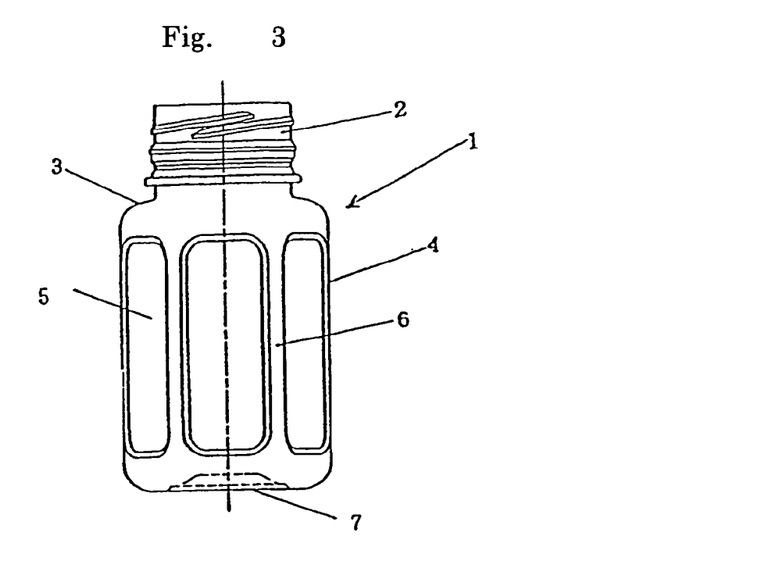
FIG. 3 shows one example of a biaxially oriented polyester container of the present invention.

FIG. 3 shows one example of the biaxially oriented polyester container of the present invention, the container having a wide-mouthed bottle shape and being suitable for use in heat-resistant applications. The biaxially oriented polyester container of the present invention, denoted by reference numeral 1, is made up of a mouth part 2, a shoulder part 3, a barrel part 4, a depressurization absorbing panel portion 5 formed in the barrel part 4, a pillar part 6, and a bottom part 7.

Figure 4:
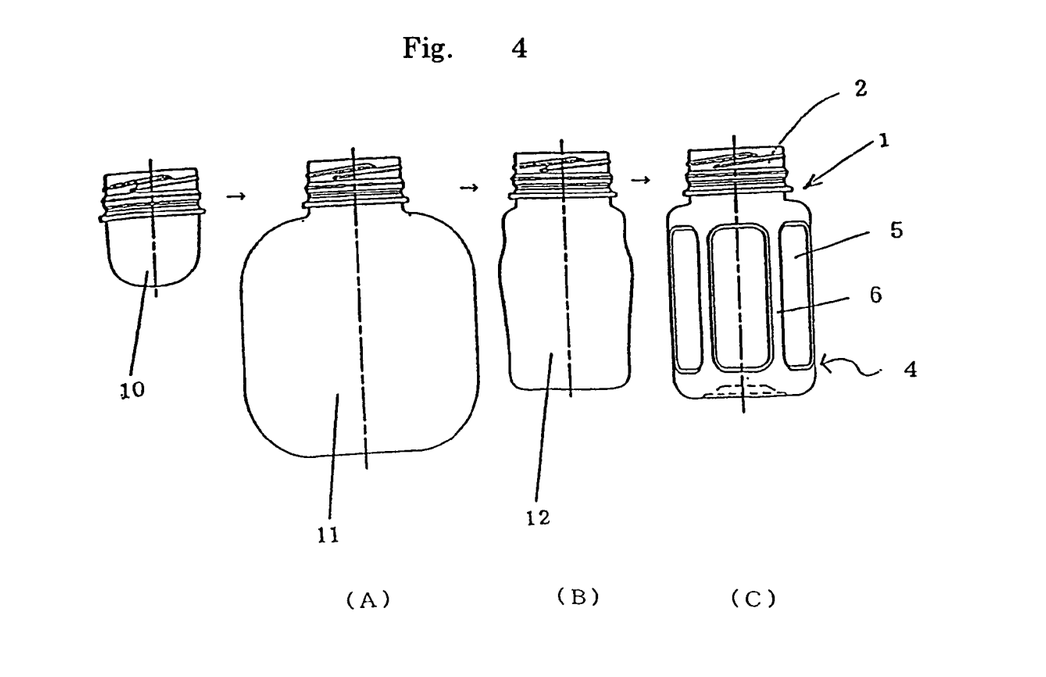
FIG. 4 is a set of views for explaining double-stage orientation blow molding for use in manufacturing the biaxially oriented polyester container of the present invention.

FIG. 4 is a set of views for explaining steps of manufacturing the biaxially oriented polyester container 1 by double-stage orientation blow molding. A preform 10 made of a polyester resin and having a wide mouth is heated to temperatures, e.g., 95-115° C., not lower than the glass transition point (Tg). Primary orientation blow molding is performed on the heated preform with a primary mold held in the range of room temperature to 70° C., thereby obtaining a primary molded product 11 larger than a final biaxially oriented polyester container.

(Step A)

The temperature of the primary mold may be held, as required, at higher temperatures in the range of, e.g., 140° C. to the melting point or below.

After heating the primary molded product 11 in a heating oven at 600-800° C. for 5-10 seconds, the primary molded product 11 is heat-shrunk with the surface temperature adjusted to the range of 170-190° C., thereby obtaining a secondary molded product 12. (Step B)

Finally, secondary orientation blow molding is performed on the secondary molded product 12 with a secondary mold held at temperatures in the range of 150-180° C., and the barrel part 4 and the bottom part 7 are heat-set for 1.5-5 seconds except for the mouth part 2, thereby obtaining, as a final molded product, the biaxially oriented polyester container 1 in the form of a wide-mouthed bottle. (Step C)

Figure 5:
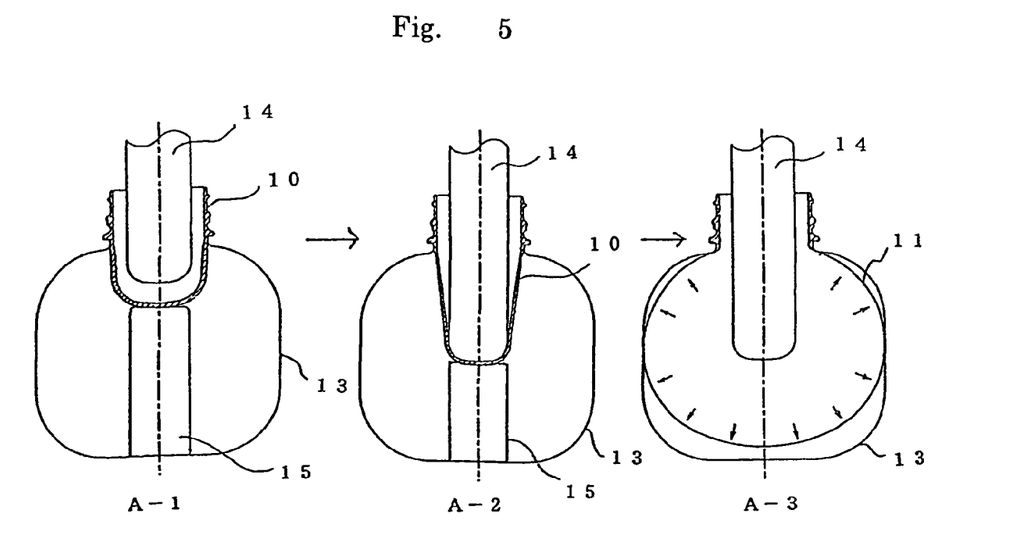
FIG. 5 is a set of views for explaining primary orientation blow molding for use in manufacturing the biaxially oriented polyester container of the present invention.

FIG. 5 is a set of views showing the primary orientation blow molding by the use of the primary mold when the biaxially oriented polyester container in the form of a wide-mouthed bottle is manufactured by the double-stage orientation blow molding described above. In the primary orientation blow molding, a stretch rod 14 is first inserted in the preform 10 supplied to a primary mold 13, following which a bottom part of the preform 10 is retrained by the stretch rod 14 and the press rod 15. (Step A-1)

Then, orientation blow molding is performed on the preform 10 while the bottom part of the preform 10 is restrained by the stretch rod 14 and the press rod 15. (Step A-2) At the time of blow-molding the bottom part of the preform to be shaped into the primary molded product 11, the bottom part is released from the restrained state, whereby the primary molded product 11 larger than the final biaxially oriented polyester container 1 is obtained. (Step A-3)

Subsequently, the primary molded product 11 is subjected to heat shrinkage and then to the secondary orientation blow molding, thereby obtaining, as a final molded product, the biaxially oriented polyester container 1 in the form of a wide-mouthed bottle.

Figure 6:
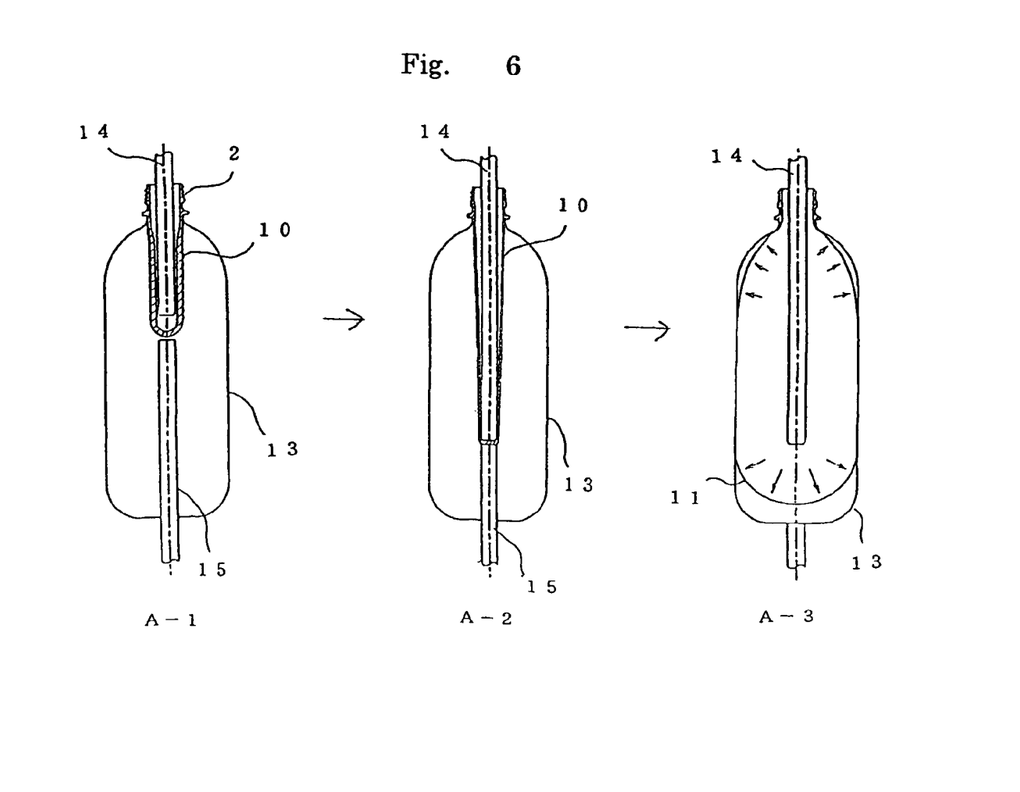
FIG. 6 is a set of views for explaining another example of the primary orientation blow molding for use in manufacturing the biaxially oriented polyester container of the present invention.

FIG. 6 is a set of views showing the primary orientation blow molding performed as one stage of the double-stage orientation blow molding when the biaxially oriented polyester container of the present invention is manufactured in the form of a usual bottle. The double-stage orientation blow molding is performed in a similar manner to that in the case of manufacturing the biaxially oriented polyester container 1 in the form of a wide-mouthed bottle.

More specifically, after heating a preform 10 made of a polyester resin to temperatures, e.g., 95-115° C., not lower than the glass transition point (Tg), a stretch rod 14 is first inserted in the preform 10 and brought into contact with a bottom part of the preform 10. (Step A-1)

Then, orientation blow molding is performed on the preform while the bottom part of the preform is restrained by the stretch rod 14 and a press rod 15. (Step A-2) At the time of blow-molding the bottom part of the preform to be shaped into a primary molded product, the bottom part is released from the restrained state, whereby the primary molded product 11 larger than a final biaxially oriented polyester container is obtained. (Step A-3)

Subsequently, the primary molded product 11 is subjected to heat shrinkage and then to the secondary orientation blow molding as described above, thereby obtaining, as a final molded product, the biaxially oriented polyester container 1 in the form of a usual bottle.

The biaxially oriented polyester container of the present invention is adaptable for applications requiring resistance against heat, heat and pressure, and pressure. When the biaxially oriented polyester container is used in applications requiring resistance against either heat or heat and pressure, the mouth part 2 of the preform 10 is crystallized, as required, by using a heating means.

Further, the biaxially oriented polyester container can be given with resistance against either heat or heat and pressure, as required. More specifically, the temperature of the secondary mold for use in the secondary orientation blow molding is set to the range of 90-150° C. when the container is used in applications requiring resistance against heat, and the temperature of the secondary mold is set to in the range of above 150° C. to the melting point or below when the container is used in applications requiring high resistance against heat. Further, the temperature of the secondary mold is set to the range of room temperature to 90° C. when the container is used in applications requiring resistance against heat and pressure.

[Polyester Resins]

As resins forming the biaxially oriented polyester container of the present invention, any kind of polyester resins is usable so long as it can be shaped by the biaxial orientation blow molding. Examples of usable resins include polyesters such as ethylene terephthalate based thermoplastic polyester, polybutylene terephthalate, and polyethylene naphthalate, as well as blends of those polyesters with any of polycarbonates, arylate resins, etc.

In the ethylene terephthalate based thermoplastic polyester for use in the biaxially oriented polyester container of the present invention, ethylene terephthalate units occupy most of ester repetitive units, generally not less than 70 mol % and in particular not less than 80 mol %. Preferably, the thermoplastic polyester resin has the glass transition point (Tg) of 50-90° C., in particular 55-80° C., and the melting point (Tm) of 200-275° C., in particular 220-270° C.

One preferable example of such thermoplastic polyester resin is homo-polyethylene terephthalate. As an alternative, copolymer polyester containing a small amount of ester units other than ethylene terephthalate units is also usable.

Other examples of dibasic acids than terephthalic acid include one or combination of two or more selected from among aromatic dicarboxylic acids such as isophthalic acid, phthalic acid and naphthalene dicarboxylic acid; alycyclic dicarboxylic acids such as cyclohexane dicarboxylic acid; and aliphatic dicarboxylic acids such as succinic acid, adipic acid, sebacic acid and dodecanedione acid. Also, other examples of diol components than ethylene glycol include one or combinations of two or more selected from among propylene glycol, 1,4-butane diol, diethylene glycol, 1,6-hexylene glycol, cyclohexane dimethanol, and bisphenol A added with ethylene oxide.

Further, it is also possible to use a composite material prepared by blending the ethylene terephthalate based thermoplastic polyester with about 5-25% of, e.g., polyethylene naphthalate, polycarbonate, or polyarylate which has a comparatively high glass transition point. The use of such a composite material is effective in increasing the material strength at high temperatures.

Alternatively, polyethylene terephthalate and the above-mentioned material having a comparatively high glass transition point may be used in the multilayered form. In addition, the thermoplastic polyester resin may be added, as required, with a lubricant, a modifier, a pigment, an ultraviolet absorber and the like.

The ethylene terephthalate based thermoplastic polyester resin used in the present invention should have molecular weight sufficient to form at least a film, and it is selected from the injection or extrusion grade resins depending on the field of applications.

The ethylene terephthalate based thermoplastic polyester preferably has intrinsic viscosity (I.V) of generally in the range of 0.6 to 1.4 dL/g and in particular in the range of 0.63 to 1.3 dL/g.

Additionally, in the biaxially oriented polyester container of the present invention, an oxidizable organic component may be oxidized for trapping of oxygen by using a transition metal catalyst such as cobalt. The oxidizable organic component includes, for example, polyamide, in particular polyamide containing a xylylene group.

[Oxygen Barrier Multilayered Structure]

The biaxially oriented polyester container of the present invention may be of the multilayered structure in which an oxygen barrier layer is formed as an intermediate layer between polyester resin layers forming inner and outer layers. A thermoplastic resin usable to form the oxygen barrier layer may be any of known oxygen barrier thermoplastic resins and includes, for example, an ethylene-vinylalcohol copolymer, polyamide and a copolymer thereof, barrier-acting polyester, polyvinylidene chloride based resins, polyvinyl alcohol, fluorine-contained resins, or combinations thereof.

An especially preferable example of the oxygen barrier resin is a saponified ethylene-vinylacetate copolymer obtained by saponifying an ethylene-vinylacetate copolymer having an ethylene content of 20-60 mol %, in particular 25-50 mol %, to such an extent that a saponification degree is not less than 96 mol %, in particular not less than 99 mol %.

Another preferable example of the oxygen barrier resin is polyamides containing amide groups in number of 5-50, in particular 6-20, per 100 carbons, such as nylon 6, nylon 6,6, a nylon 6/6,6 copolymer, metaxylene adipamide ((MXD6), nylon 6,10, nylon 11, nylon12, and nylon 13.

[Oxygen Absorbing Multilayered Structure]

In the biaxially oriented polyester container of the present invention, the above-mentioned gas barrier layer (intermediate layer) may be given with an oxygen absorbing property, or the above-mentioned gas barrier layer may be of the multilayered structure in which the layer resin has an oxygen absorbing property in itself. That type of resin is available, for example, by utilizing the oxidation reaction of resin. A practically usable example can be prepared by adding oxidative organic materials such as polybutadiene, polyisoprene, polypropylene, an ethylene-carbon oxide polymer, polyamides including nylon-6, nylon-12 and metaxylene diamine (MX) nylon, with, as an oxidation catalyst, salt of an organic acid containing a transition metal such as cobalt, rhodium or copper, and with a photosensitizer such as benzophene, acetophene or chloroketones. In the case of using those oxygen absorbing materials, a more significant effect can be developed by irradiating a high-energy ray or beam, for example, an ultraviolet ray or an electron beam, to the resin.

Alternatively, the resin of the above-mentioned gas barrier layer may contain an oxidizable organic component so as to develop an oxygen absorbing property without a reduction of the gas barrier property, which is caused by oxidative deterioration of the gas barrier layer. Such an oxidizable organic component is preferably a polyene based polymer derived from polyenes. The component also preferably contains a carboxylic group, a carboxylic anhidride group, or a hydroxyl group. Examples of those functional groups include acrylic acid, methacrylic acid, maleic acid, unsaturated carboxylic acid, unsaturated maleic acid, anhidrated maleic acid, and an anhidride of unsaturated carboxylic acid. The transition metal catalyst is preferably cobalt.

In addition, the resin forming the above-mentioned gas barrier layer may be added with an oxygen absorber. The oxygen absorber can be prepared, for example, by using, as a main component, a reducing metallic powder, such as one of a reducing iron powder, reducing zinc, a reducing tin powder, a metallic low-level oxide and a reducing metallic compound, or a combination of two or more selected from among them. Those materials can be used, as required, in combination with aides such as hydroxides, carbonates, sulfites, organic acid salts, and halides of alkaline metals and alkaline earth metals, as well as activated carbon and activated alumina. Another example of the oxygen absorber is a high molecular compound having polyvalent phenol in the skeleton, for example, a phenol-aldehyde resin containing polyvalent phenol. To ensure transparency or translucency, those oxygen absorbers preferably have an average particle size of generally not larger than 10 µm and in particular not larger than 5 µm.

The gas barrier layer resin, the oxygen absorbing resin, and the oxygen absorbing materials mentioned above may be added with any of aids and modifiers, such as a filler, a colorant, a heat-resistance stabilizer, a weather-resistance stabilizer, an antioxidant, an antiaging agent, a light stabilizer, an ultraviolet absorber, an antistatic agent, a metallic soap, and wax.

When forming the multilayered structure, an adhesive or an adhesive layer may be interposed, as required, between adjacent resin layers.

[Manufacturing of Preform]

When producing a preform for the biaxially oriented polyester container using the resin mentioned above, the preform is manufactured in shape corresponding to a preform mold by employing a well-known injection molding machine regardless of the preform being of the single-layer or multilayered structure.

In the case of the multilayered structure, a multilayered preform is manufactured in shape corresponding to an injection preform mold by employing a co-injection molding machine such that inner and outer layers are made of the polyester resin and one or more intermediate layers are formed between the inner and outer layers.

As an alternative, a multilayered preform can be manufactured by employing a multi-stage injection molding machine through steps of injection-molding a primary preform made of the polyester resin with a primary mold, transferring the primary preform into a secondary mold, injecting the resin forming the intermediate layer over the surface of the primary preform to obtain a secondary preform, transferring the secondary preform into a tertiary mold, and injecting the polyester resin over the surface of the secondary preform to form the outer layer.

Further, the preform can also be manufactured by compression molding. In this case, a molten resin mass is supplied to a female mold without essentially causing a temperature drop and then subjected to compression molding by pressing a male mold.

Moreover, in the case of the multilayered preform, an intermediate layer resin is put in a molten resin mass for forming inner and outer layers, and the resulting molten resin mass is supplied to a female mold without essentially causing a temperature drop and then subjected to compression molding by pressing a male mold.

Because the preform obtained with compression molding does not have a gate portion in its bottom part, it is especially superior in points of providing a uniformly and sufficiently elongated and thinner wall in and near the bottom center area, and increasing the drop strength and ESC resistance.

In the case of imparting resistance against either heat or heat and pressure to mouth and neck parts of the preform thus obtained, the mouth and neck parts are subjected to heat treatment for crystallization in the stage of the preform or after the biaxial orientation blow molding.

EXAMPLE 1

After crystallizing (whitening) a mouth part of a compression-molded preform made of the polyethylene terephthalate resin by a suitable means, the preform was heated to 110° C. not lower than the glass transition point and was supplied to a primary mold held at a temperature of 25° C. (See FIG. 5: A-1) Then, orientation blow molding was performed on the preform until halfway the primary mold in a state in which a bottom part of the preform was restrained by a stretch rod. (See FIG. 5: A-2)

At the time of blow-molding a bottom part of a primary molded product, pressurized air was blown into the preform while the bottom part was released from the restrained state, thereby performing biaxial orientation blow molding with the primary mold at elongation rates of 3.3 times in the vertical direction, 3.0 times in the horizontal direction, and 9.6 times in area to obtain the primary molded product having a mouth diameter of 48 mm, a barrel diameter of 120 mm and a height of 120 mm larger than a final biaxially oriented polyester container. (See FIG. 4: A and FIG. 5: A-3)

Subsequently, the primary molded product was heat-shrunk in a heating oven wherein the surface temperature of the primary molded product was adjusted to the range of 170-190° C. to obtain a secondary molded product having a mouth diameter of 48 mm, a barrel diameter of 70 mm and a height of 95 mm. (See FIG. 4: B)

Thereafter, the secondary molded product was subjected to biaxial orientation blow molding with a secondary mold held at a temperature of 180° C. at elongation rates of 1.1 times in the vertical direction, 1.2 times in the horizontal direction, and 1.3 times in area. A barrel part and a bottom part of the secondary molded product were then heat-set for 3 seconds except for a mouth part thereof to obtain a biaxially oriented polyester container in the form of a wide-mouthed bottle having a mouth diameter of 48 mm, a barrel diameter of 74 mm and a height of 100 mm.

When taking the polyester container out of the secondary mold, cooling blow was performed by blowing air at 25° C. into the container for 1 second.

Figure 7:
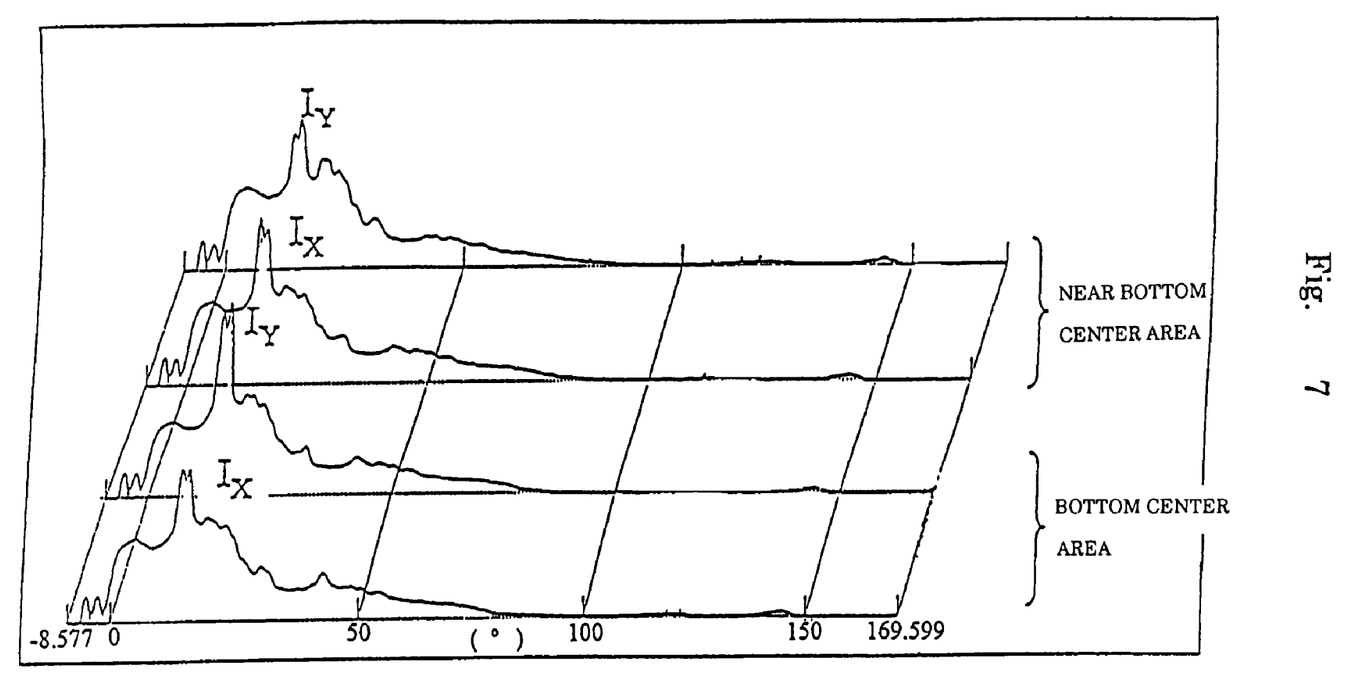
FIG. 7 is a graph resulting from the X-ray diffraction measurement of a biaxially oriented polyester container obtained in Example 1.

A square sample piece having each side of 5 mm was cut out from a bottom center area of the thus-obtained biaxially oriented polyester container and from an area in which a sample piece center was coincident with a position away from the bottom center by a distance of 16 mm. The sample pieces thus cut out were subjected to an X-ray diffraction measurement. The results of the X-ray diffraction measurement are shown in FIG. 7.

EXAMPLE 2

After crystallizing (whitening) a mouth part of an injection-molded preform made of the polyethylene terephthalate resin by a suitable means, the preform was heated to 110° C. not lower than the glass transition point and was supplied to a primary mold held at a temperature of 25° C. (See FIG. 6: A-1) Then, orientation blow molding was performed on the preform until halfway the primary mold in a state in which a bottom part of the preform was restrained by a stretch rod and a press rod. (See FIG. 6: A-2)

At the time of blow-molding a bottom part of a primary molded product, pressurized air was blown into the preform while the bottom part was released from the restrained state, thereby performing biaxial orientation blow molding with the primary mold at elongation rates of 2.7 times in the vertical direction, 3.4 times in the horizontal direction, and 9.2 times in area to obtain the primary molded product having a mouth diameter of 28 mm, a barrel diameter of 85 mm and a height of 230 mm larger than a final biaxially oriented polyester container. (See FIG. 6: A-3)

Subsequently, the primary molded product was heat-shrunk in a heating oven wherein the surface temperature of the primary molded product was adjusted to the range of 170-190° C. to obtain a secondary molded product having a mouth diameter of 28 mm, a barrel diameter of 69 mm and a height of 186 mm.

Thereafter, the secondary molded product was subjected to biaxial orientation blow molding with a secondary mold held at a temperature of 155° C. at elongation rates of 1.1 times in the vertical direction, 1.2 times in the horizontal direction, and 1.3 times in area. A barrel part and a bottom part of the secondary molded product were then heat-set for 2 seconds except for a mouth part thereof to obtain a biaxially oriented polyester container in the form of a usual bottle having a mouth diameter of 28 mm, a barrel diameter of 72 mm and a height of 190 mm.

When taking the polyester container out of the secondary mold, cooling blow was performed by blowing air at 25° C. into the container for 1 second.

Figure 8:
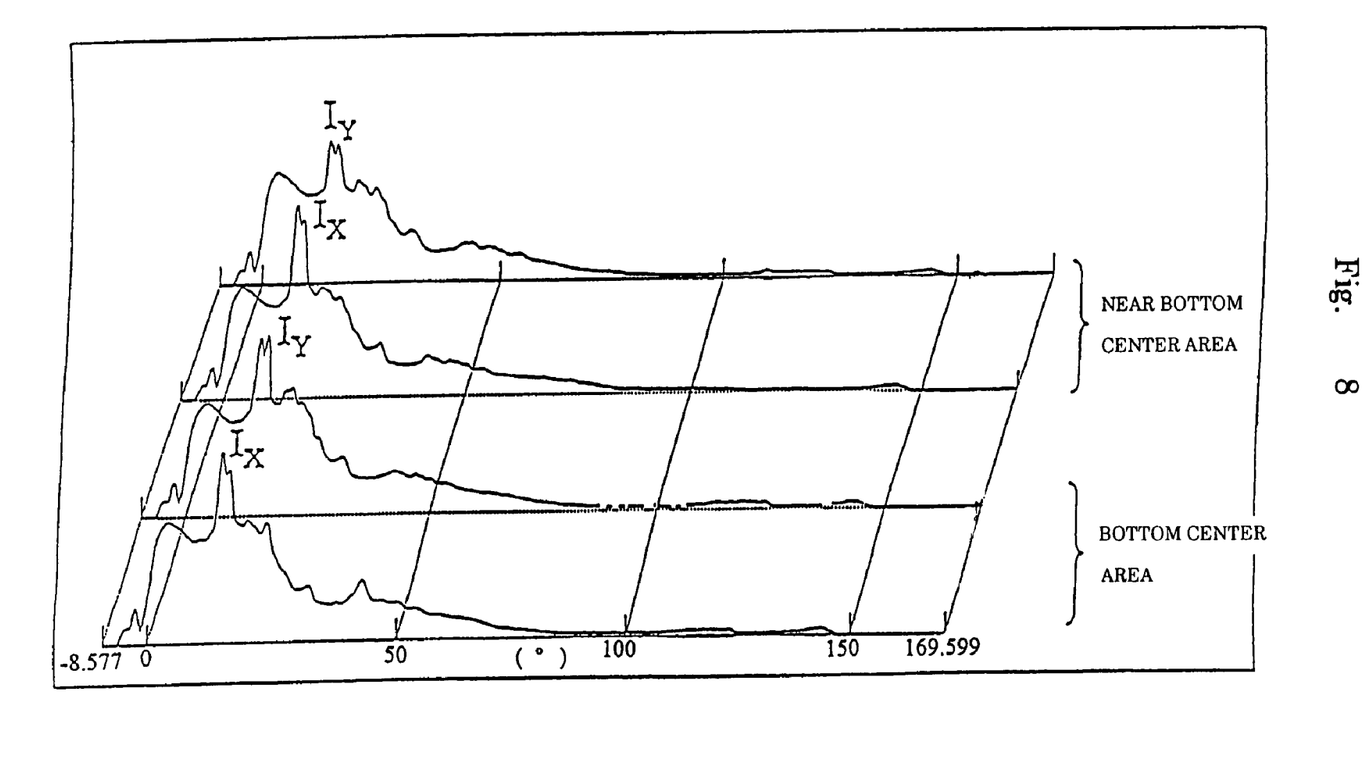
FIG. 8 is a graph resulting from the X-ray diffraction measurement of a biaxially oriented polyester container obtained in Example 2.

A square sample piece having each side of 5 mm was cut out from a bottom center area of the thus-obtained biaxially oriented polyester container and from an area in which a sample piece center was coincident with a position away from the bottom center by a distance of 15 mm. The sample pieces thus cut out were subjected to an X-ray diffraction measurement. The results of the X-ray diffraction measurement are shown in FIG. 8.

COMPARATIVE EXAMPLE 1

A biaxially oriented polyester container in the form of a wide-mouthed bottle was manufactured in the same manner as in Example 1 except for that, during the primary orientation blow molding performed in Example 1 with the primary mold, the bottom part of the primary molded product was blow-molded in a state in which the bottom part of the preform was restrained by the stretch rod.

Figure 9:
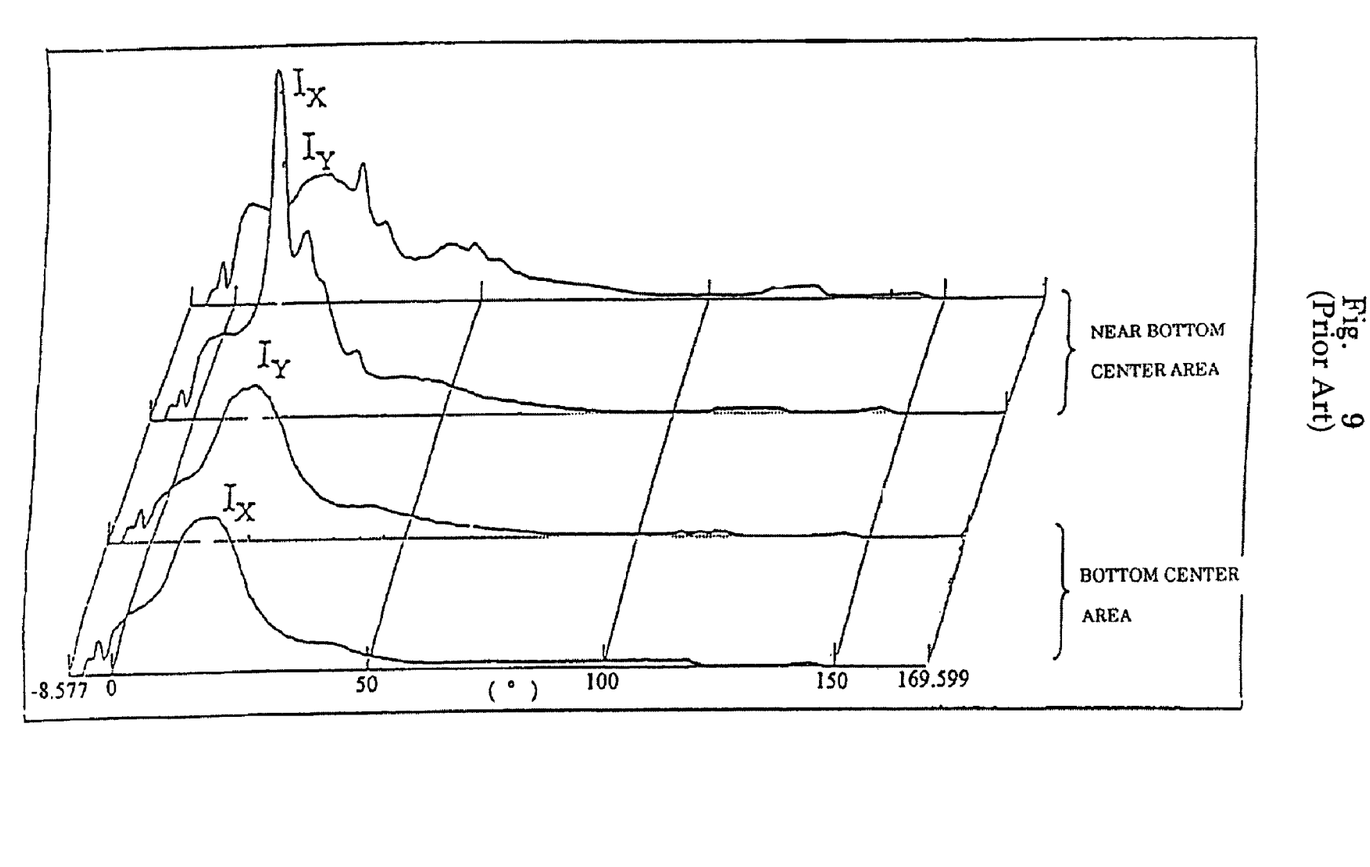
FIG. 9 is a graph resulting from the X-ray diffraction measurement of a biaxially oriented polyester container obtained in Comparative Example 1.

A square sample piece having each side of 5 mm was cut out from a bottom center area of the thus-obtained biaxially oriented polyester container and from an area in which a sample piece center was coincident with a position away from the bottom center by a distance of 16 mm. The sample pieces thus cut out were subjected to an X-ray diffraction measurement. The results of the X-ray diffraction measurement are shown in FIG. 9.

COMPARATIVE EXAMPLE 2

A biaxially oriented polyester container in the form of a usual bottle was manufactured in the same manner as in Example 2 except for that, during the primary orientation blow molding performed in Example 2 with the primary mold, the bottom part of the primary molded product was blow-molded in a state in which the bottom part of the preform was restrained by the stretch rod and the press rod.

Figure 10:
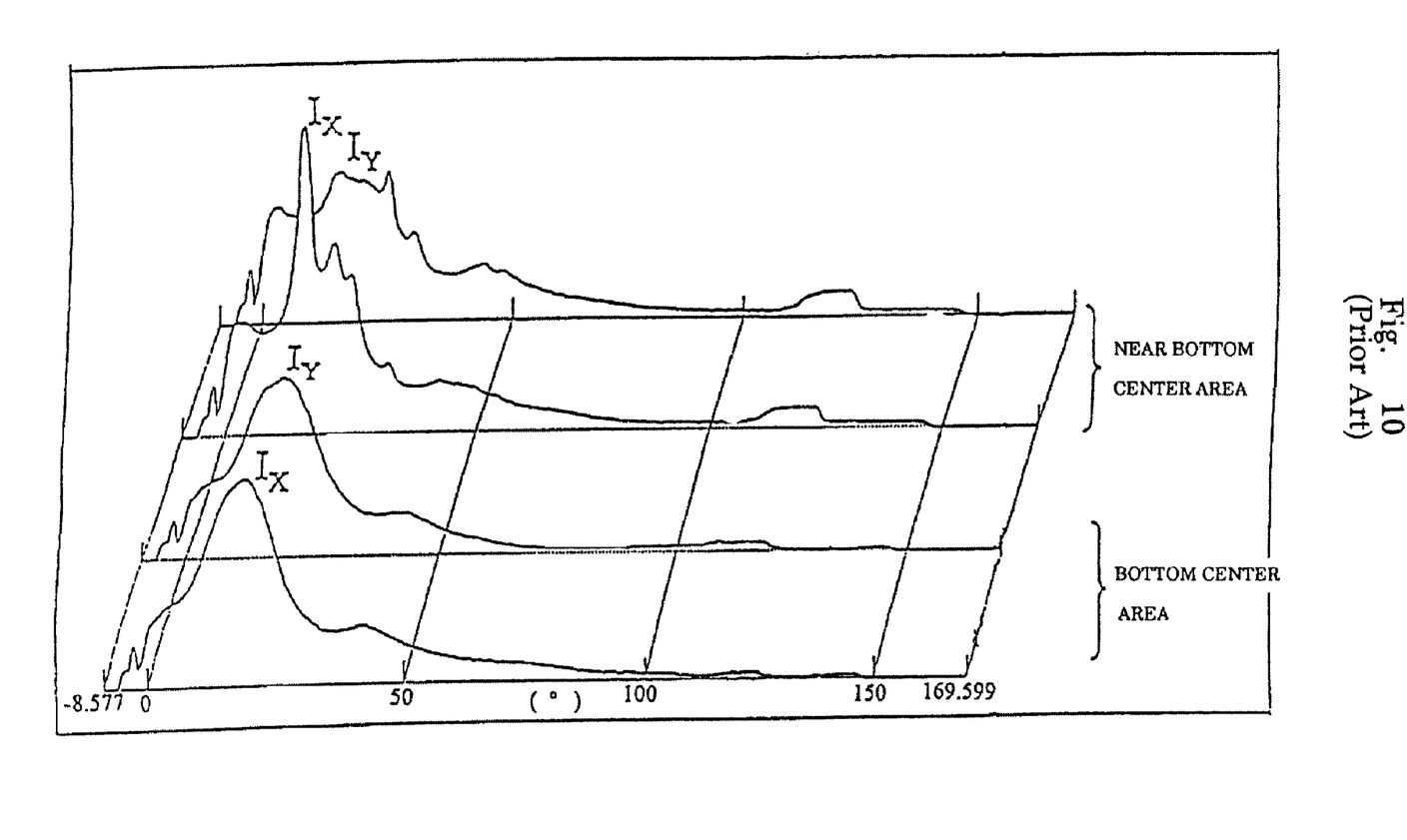
FIG. 10 is a graph resulting from the X-ray diffraction measurement of a biaxially oriented polyester container obtained in Comparative Example 2.

A square sample piece having each side of 5 mm was cut out from a bottom center area of the thus-obtained biaxially oriented polyester container and from an area in which a sample piece center was coincident with a position away from the bottom center by a distance of 15 mm. The sample pieces thus cut out were subjected to an X-ray diffraction measurement. The results of the X-ray diffraction measurement are shown in FIG. 10.

The X-ray diffraction measurement was performed as described below on the sample pieces cut out from the polyester containers obtained in above Examples and Comparative Examples. The results of the X-ray diffraction measurement are listed in Table 1.

[X-Ray Diffraction Measurement]

The square sample piece having each side of 5 mm and cut out from just and near the bottom center area of the biaxially oriented polyester container obtained in each of above Examples and Comparative Examples was measured on the orientation state of the blow-molded bottom part in the X-direction by employing an X-ray diffraction measuring device (made by Rigaku Corporation) (diffraction angle=2θ).

Then, each sample piece was rotated 90° and the X-ray diffraction measurement was performed at the diffraction angle of 2θ in the same manner to confirm the orientation state of the blow-molded bottom part in the Y-direction.

Subsequently, the orientation parameter (BO) was calculated based on the following formula:

$$\text{orientation parameter } (BO) = Ix/Iy \quad (1)$$

(where Ix indicates a diffraction intensity near the diffraction angle of 2θ=15 to 30° when the X-ray diffraction measurement was performed in the X-direction, and Iy indicates a diffraction intensity near the diffraction angle of 2θ=15 to 30° when the X-ray diffraction measurement was performed in a direction orthogonal to that for Ix)

TABLE 1

| | Bottom center area | | | | Near bottom center area | | | |
|---|---|---|---|---|---|---|---|---|
| | Peak position | Ix | Iy | BO | Peak position | Ix | Iy | BO |
| Ex. 1 | 16° | 1489 | 2114 | 0.7 | 16° | 2016 | 1811 | 1.1 |
| Ex. 2 | 16° | 2068 | 2047 | 1.0 | 16° | 2511 | 1569 | 1.6 |
| Com. Ex. 1 | none | — | — | — | 16° | 2434 | 667 | 3.6 |
| Com. Ex. 2 | none | — | — | — | 16° | 2028 | 837 | 2.4 |

In Table 1, the peak position of "16°" means that a peak appears near 2θ=16°, and "none" means that no distinct peak appears near 2θ=15 to 30°.

Furthermore, a unit for Ix and Iy is (counts/mm), and BO is an orientation parameter expressed by the above formula (1).

(Property Evaluation of Polyester Container)

Of the biaxially oriented polyester containers obtained in above Examples and Comparative Examples, those ones of Example 1 and Comparative Example 1 were tested through the steps of filling baby food (rice gruel) heated to 95° C., sealing the polyester container, and carrying out a retort sterilizing process at 120° C. for 30 minutes. Also, the polyester containers of Example 2 and Comparative Example 2 were tested by filling vegetable juice heated to 95° C. The polyester containers sealed after filled with the respective contents were evaluated for drop strength, ESC resistance and heat resistance as follows.

[Drop Strength]

For 100 polyester containers sealed after filled with each content, the occurrence of a crack in and near the bottom center area was visually confirmed by dropping each polyester container from a height of about 1.2 m five times with the bottom part directed downward.

In this evaluation, the polyester container was rated good when no cracks occurred in and near the bottom center area until dropping it five times.

[ESC Resistance]

For 100 polyester containers sealed after filled with each content, the occurrence of a crack in and near the bottom center area was visually confirmed by leaving each polyester container in an atmosphere of 48° C.-100% RH for two weeks and then dropping the polyester container from a height of about 1.2 m five times with the bottom part directed downward.

In this evaluation, the polyester container was rated good when no cracks occurred in and near the bottom center area until dropping it three times.

[Heat Resistance]

For the polyester containers obtained in above Examples and Comparative Examples, after filling the contents and sealing the polyester containers as described above, a deformation of the bottom part and whitening in and near the bottom center area of each container were visually confirmed.

Table 2 lists the evaluation results. In Table 2, the numeral in each of columns indicating the drop strength and the ESC resistance means the number of polyester containers cracked as a result of testing 100 polyester containers for each item.

TABLE 2

| | Drop strength | ESC resistance | Heat resistance (bottom deformation and whitening) |
|---|---|---|---|
| Ex. 1 | 0 | 0 | none |
| Ex. 2 | 0 | 0 | none |
| Com. Ex. 1 | 8 | 12 | large deformation and whitening in center area |
| Com. Ex. 2 | 4 | 7 | deformation and whitening in center area |

INDUSTRIAL APPLICABILITY

According to the present invention, a biaxially oriented polyester container with a uniformly and sufficiently elongated and thin-walled bottom part having excellent drop strength, improved ESC resistance and reduced weight can be obtained. Particularly, those superior properties can be ensured in applications requiring heat resistance against high temperatures.

Also, with the method of manufacturing the biaxially oriented polyester container according to the present invention, a biaxially oriented polyester container with a uniformly and sufficiently elongated and thin-walled bottom part having excellent drop strength and improved ESC resistance can be more easily manufactured at a relatively low cost without requiring a mold for shaping a bottom part of the container to have a complicated shape.

The invention claimed is:

1. A method of manufacturing a biaxially-oriented polyester container formed by a double-stage orientation blow molding method, the containers having a uniformly elongated bottom part having uniform wall thickness, the method comprising:
    (a) performing two-stage primary orientation blow molding of a preform made of a polyester resin to obtain a primary molded product larger than a final molded product, the two stages of primary orientation blow molding comprising:
        (i) a first stage, wherein the bottom part of the preform is elongated while being restrained by a stretch rod and a press rod to obtain an elongated preform; and
        (ii) a second stage, wherein the bottom part of the elongated preform is released from the restrained state prior to blow molding to provide the primary molded product;
    (b) heat-shrinking said primary molded product into a secondary molded product; and
    (c) performing secondary orientation blow molding of said secondary molded product to obtain the final molded product.

* * * * *